United States Patent

Meier

Patent Number: 5,598,049
Date of Patent: Jan. 28, 1997

[54] SLOT SEALING ARRANGEMENT

[75] Inventor: Walter Meier, Waltenschwil, Switzerland

[73] Assignee: ABB Management AG, Baden, Switzerland

[21] Appl. No.: 292,752

[22] Filed: Aug. 18, 1994

[30] Foreign Application Priority Data

Aug. 18, 1993 [DE] Germany ............ 43 27 775.6

[51] Int. Cl.⁶ ...................................... H02K 3/48
[52] U.S. Cl. ............................ 310/214; 310/201
[58] Field of Search ........................... 310/183, 197, 310/201, 214, 215

[56] References Cited

U.S. PATENT DOCUMENTS

| 3,949,255 | 4/1976 | Brown et al. | 310/214 |
| 4,547,690 | 10/1985 | Bath et al. | 310/214 |
| 4,607,183 | 8/1986 | Rieber et al. | 310/214 |
| 4,633,574 | 1/1987 | Bath et al. | 29/596 |
| 5,430,340 | 7/1995 | Shih et al. | 310/214 |

FOREIGN PATENT DOCUMENTS

| 1918859 | 10/1970 | Germany . |
| 2165727 | 7/1973 | Germany . |
| 2527876 | 11/1977 | Germany . |
| 2728907 | 12/1978 | Germany . |
| 525581 | 8/1972 | Switzerland . |
| 744849 | 6/1980 | U.S.S.R. . |

Primary Examiner—Thomas M. Dougherty
Assistant Examiner—Jonathan Link
Attorney, Agent, or Firm—Oblon, Spivak, McClelland, Maier & Neustadt, P.C.

[57] ABSTRACT

An arrangement for sealing the slots, which are filled with conductor bars or coils, in the laminated stator core of an electrical machine by use of slot sealing elements includes an upper prismatic body, on whose underneath a surface runs in an inclined manner, and a lower prismatic body. The upper surface, facing the upper body, runs inclined in the opposite direction to the gradient of the lower surface of the upper body, and actual wedging is effected by relative displacement of the two prismatic bodies with respect to one another.

In order to be able to utilize the elasticity of the upper body in the transverse direction in an optimum manner, the force is introduced from the conductor bar or coil to the upper prismatic body, essentially only in its central section, over its entire length. As a consequence, relatively large spring movements in the radial direction are available which, for their part, can compensate better for a seating phenomena in the winding structure. In this way, servicing intervals are extended and the availability of the machine is increased.

9 Claims, 3 Drawing Sheets

SLOT SEALING ARRANGEMENT

BACKGROUND OF THE INVENTION

1. Field of the Invention

The invention relates to an arrangement for sealing the slots in the laminated stator core of an electrical machine by means of slot sealing elements, which each comprising at least one upper prismatic body, on whose underneath a surface runs in an inclined manner, and a lower prismatic body, whose upper surface, facing the upper body, runs inclined in the opposite direction to the gradient of the lower surface of the upper body.

2. Discusion of the Background

A slot sealing arrangement of this type is disclosed, for example, in CH-A-525,281.

Forces act in an alternating direction on the conductor bars and coils which are arranged in the slots of electrical machines, as a result of the interaction of the electrical current flowing through the conductors and the magnetic field in the airgap. It is thus necessary to fix these conductors in the slots without any play. As a rule, this is done by wedging, with mechanical prestressing.

In the case of most known slot sealing arrangements, the conductor bars or coils are pressed against the slot base by means of compensating strips and trapezoidal wedges placed thereon. In order to compensate for a seating phenomena in operation, either sprung intermediate layers, for example a corrugated spring (DE-A 2,165,727), are provided between the slot wedge and the winding or the slot wedge itself acts as a sprung element, as in the case of CH-A-525,581 which was mentioned initially.

In the case of the arrangement according to CH-A-525,581, so-called double-inclined wedges are used. These extend over two or three partial laminated body lengths and can therefore be wedged, and also retightened, individually. For this reason, only comparatively small spring movements are required in comparison with the arrangement according to DE-A-2,165,727.

SUMMARY OF THE INVENTION

Accordingly, one object of the invention is to provide a novel slot sealing arrangement which manages without any sprung intermediate layers and nevertheless allows relatively large spring movements.

This object is achieved according to the invention in that the force is introduced from the conductor bar or coil to the upper prismatic body, essentially only in its central section, over its entire length.

The advantage of the invention can be seen especially in the fact that, as a result of this different type of force introduction, the elasticity of the upper prismatic body transversely with respect to its longitudinal direction can now be considerably better utilized. As a consequence, relatively large spring movements are available in the radial direction, which in turn can better compensate for seating phenomena in the winding structure. In this way, servicing intervals are extended and the availability of the machine is increased.

Exemplary embodiments of the invention as well as the advantages which can be achieved using said invention are explained in more detail in the following text, with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
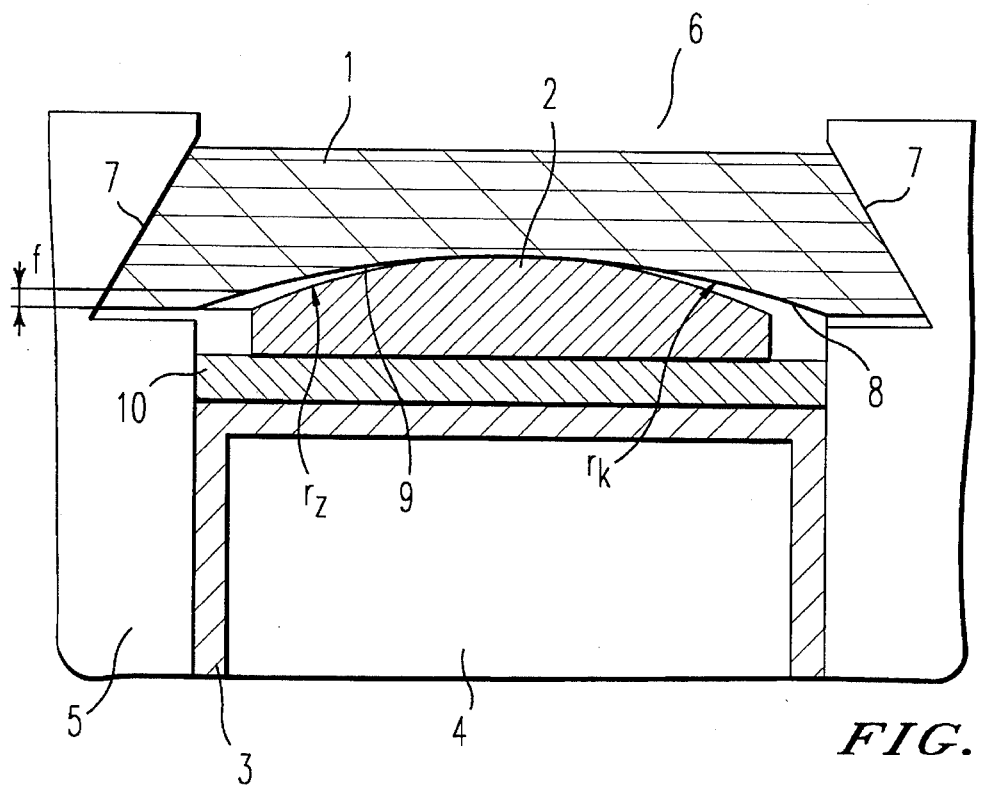
FIG. 1 shows a first exemplary embodiment of the invention with a two-piece slot seal, in the case wherein the force is introduced via convex and concave surfaces having different radii of curvature.

Referring now to the drawings, wherein like reference numerals designate identical or corresponding parts throughout the several views, reference number 1 designates the upper prismatic body—called the slot wedge in the following text—and 2 designates the lower prismatic body—called the tongue in the following text. The slot wedge and tongue jointly press the conductor bar 4, which is provided with insulation 3, against the base of the slot 6 which is stamped in the laminated stator core 5, by the slot wedge 1 being supported against the recesses 7 in the laminated stator core 5.

The slot wedge 1 is composed of high-strength glass-fiber-reinforced plastic and is elastic transversely with respect to its longitudinal direction. The lower surface 8, facing the tongue 2, of the slot wedge 1 is curved in a concave manner. Its radius of curvature is designated $r_K$. The upper surface 9, facing the slot wedge 1, of the tongue 2 is curved in a convex manner. Its radius of curvature is designated $r_Z$. The radius of curvature $r_K$ of the lower surface 8 of the slot wedge 1 is greater than the radius of curvature $r_Z$ of the upper surface 9 of the tongue 2, to be precise at least 5% greater.

Figure 3:
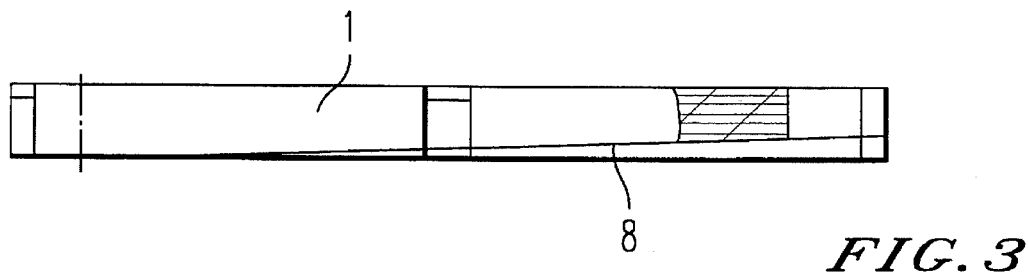
FIG. 3 shows a longitudinal section through the upper prismatic body of the sealing arrangement according to FIG. 2.
Figure 5:
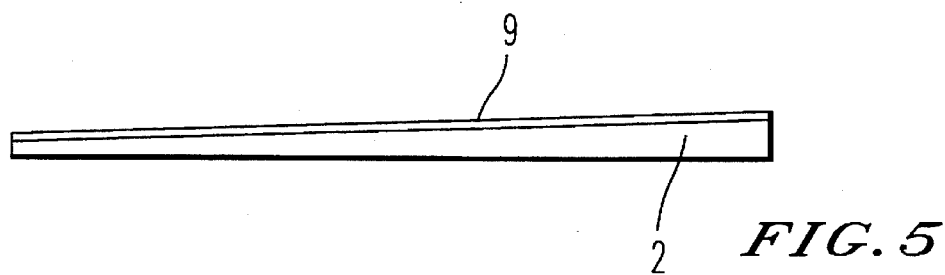
FIG. 5 shows a side view of the lower prismatic body of the sealing arrangement according to FIG. 2.

The concave surface 8 on the slot wedge 1 is additionally inclined in a flat manner in the wedge longitudinal direction (FIG. 3). The surface 9 on the tongue 2 likewise has an inclination, but running in the opposite direction, of the same size (FIG. 5). The slot wedge 1 and the tongue 2 in this manner form a double-inclined wedge so that pressure is produced in the radial direction onto the conductor bar 4 while the tongue 2 is being pressed axially into the slot wedge 1. A sliding base layer 10 composed of a plastic laminate in this case protects the insulation 3 of the conductor bar 4 and can at the same time be used for compensating for manufacturing tolerances in the radial height of the conductor bar 4.

Figure 4:
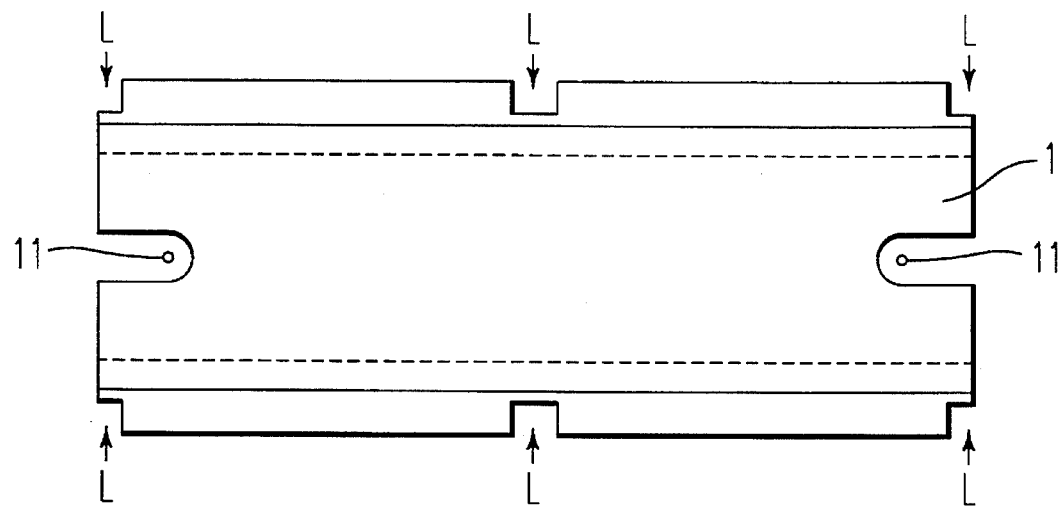
FIG. 4 shows a plan view of the upper prismatic body of the sealing arrangement according to FIG. 2.

The axial length of the slot wedge 1 is, in the example, dimensioned such that it covers a radial ventilation slot in the laminated stator core and ends approximately in the center of the two adjacent ventilation slots. The position of these ventilation slots is indicated by the arrows L in FIG. 4. The slot wedge can, of course, also cover a plurality of ventilation slots. Axially running slots 11 in the ends of the slot wedge 1 allow the tongue 2 to be displaced relative to the slot wedge by means of a suitable tool or device.

Such a device is described, for example, in CH-A-525,581. All the essential details of the mounting of the double-inclined wedge arrangement described above are also described there. However, in addition, it should be mentioned that, before the tongues 2 are pressed in, the conductor bars 3 or coils in the slot 6 are pretreated by heating and are under pressure. As a rule, this is done by the slot being temporarily sealed and hoses to which a pressure medium can be applied being inserted between the temporary slot seal and the conductors. In this way, the conductor assembly is seated in the slot 6. Subsequent stresses, which occur as a result of the effects described initially, on the conductor assembly then no longer lead—if at all—to a dangerous loosening phenomena. If such phenomena should nevertheless occur, the relatively large radial spring movement of the slot wedge 1, which is made possible by means of the invention, compensates for these effects. Governed by the concave-convex construction of the touching surfaces 8 and 9, the force is introduced into the slot wedge 1 only in its central section, and a comparatively large spring movement (dimension f in FIG. 1) is available until the two surfaces 8 and 9 come virtually completely into contact.

Figure 2:
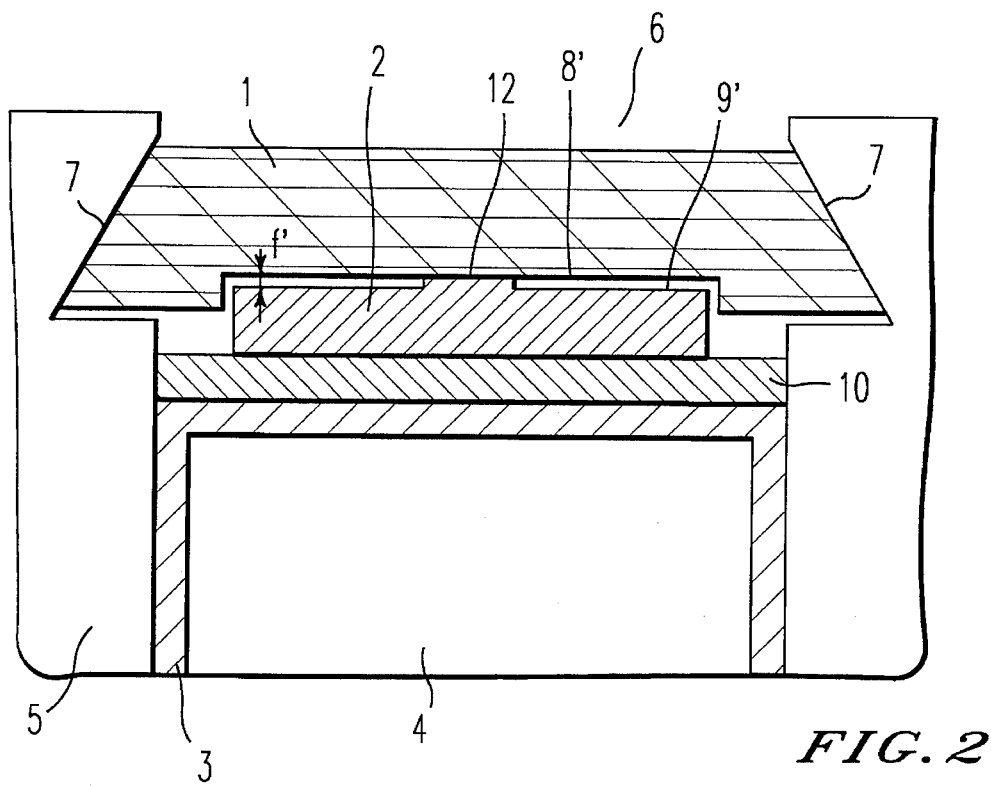
FIG. 2 shows a second exemplary embodiment of the invention having a two-piece slot seal, in the case of which the force is introduced via a strip-like projection in the central section of the lower body.

FIG. 2 shows a modification of the invention. In the case of this double-inclined wedge arrangement, the lower surface 8' of the slot wedge 1 is designed flat. The tongue 2 likewise has flat surfaces 9', with the exception of a strip-shaped projection 12 running in the longitudinal direction of the tongue. The strip-shaped projection 12 is preferably constructed integrally with the tongue 2. Its width is approximately 20% of the width of the slot 6, typically between 10 and 15 mm in the case of a slot width of 40 to 75 mm.

The height of the strip-shaped projection 12 is governed by the maximum spring movement f' provided and is 1 to 2 mm. In other respects, the construction and mounting of the double-inclined wedge according to FIG. 2 corresponds to that of the arrangement according to FIG. 1.

As an alternative, the strip-like projection 12 can also be constructed on the surface 8, facing the tongue 2, of the slot wedge 1 and can preferably be designed integrally therewith. The surface 9, facing the slot wedge 1, of the tongue 2 is then designed so as to be flat. This variant is not expressly illustrated in the drawing.

Figure 6:
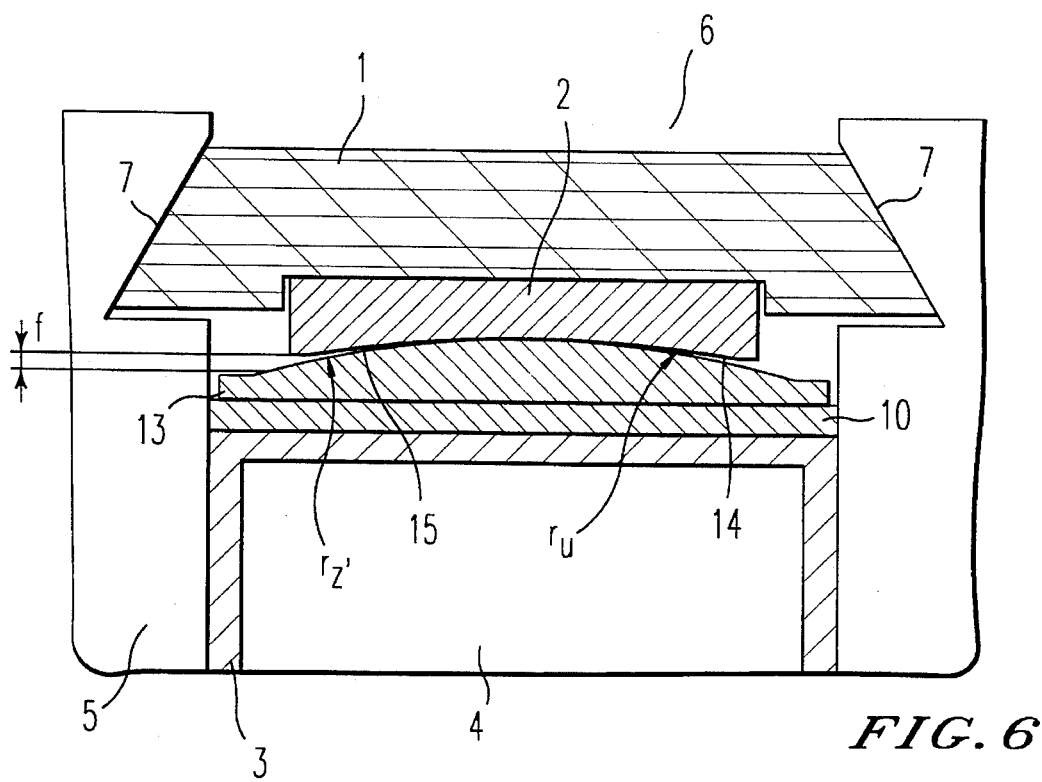
FIG. 6 shows a modification of the embodiment illustrated in FIG. 1, having an intermediate element between the winding and the lower prismatic body, the upper surface of the intermediate element being curved in a convex manner and the lower surface of the lower body being curved in a concave manner.
Figure 7:
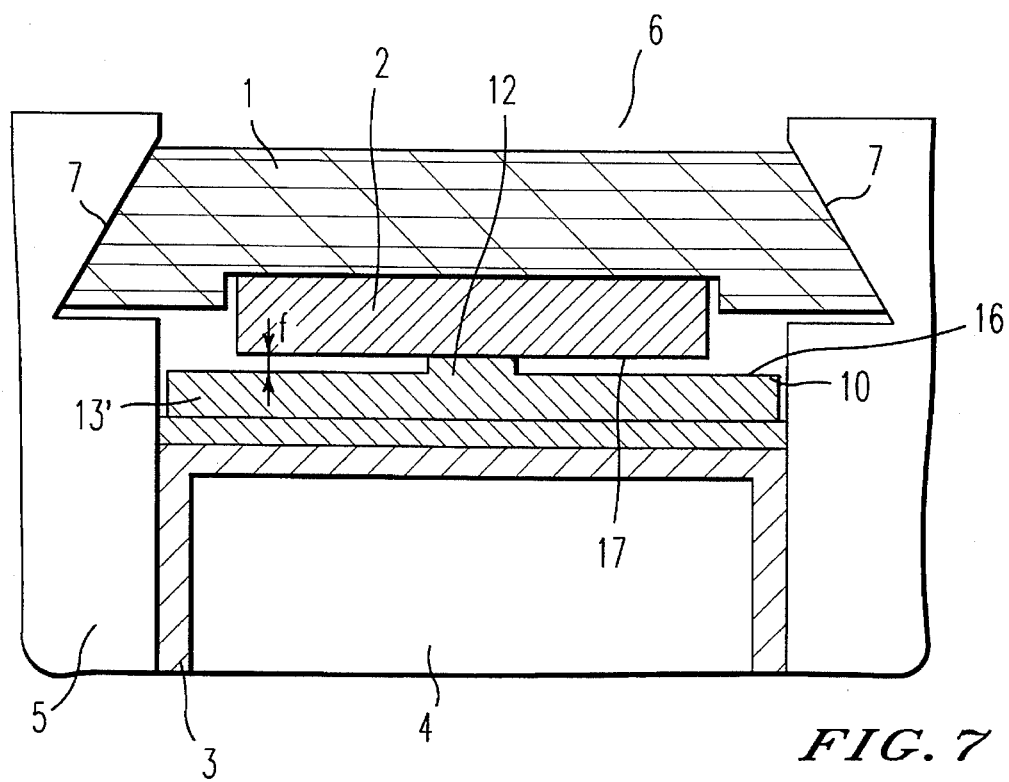
FIG. 7 shows a modification of the embodiment illustrated in FIG. 2, having an intermediate element between the winding and the lower prismatic body, the upper surface of the intermediate element having a strip-like projection.

The variants of the invention illustrated in FIGS. 6 and 7 have as a common feature intermediate elements 13 and 13' which, in conjunction with the tongue 2, increase the spring movement f (even if their size is smaller than in the case of the variants according to FIGS. 1 and 2).

In the arrangement according to FIG. 6, the lower surface 14, facing the conductor bar 4, of the tongue is designed in a concave manner with a radius of curvature $r_z'$, while the upper surface 15, facing the tongue 2, of the intermediate element 13 is curved in a convex manner with a radius of curvature $r_U$. In an analogous manner to FIG. 1, the radius of curvature $r_z'$ is greater than the radius of curvature $r_U$. Since the intermediate element 13 can here take over the function of the sliding base layer 10 entirely or partially, the latter can be designed thinner or can be completely omitted, so that the slot 6 need not be made deeper.

In the arrangement according to FIG. 7, the intermediate element 13 has on its surface 16 facing the tongue 2 a strip-shaped projection 12, while the lower surface 17, facing the intermediate element 13', of the tongue 2 is flat. Once again, in an analogous manner to FIG. 6, the intermediate element 13' can take over the function of the sliding base layer 10 entirely or partially so that this can be designed thinner or can be completely omitted, so that the slot 6 need not be made deeper. This embodiment is particularly suitable for retrofit purposes, because the actual double-inclined wedge can be kept unchanged.

The strip-shaped projection 12 can also, of course, be constructed on the lower surface 17 of the tongue 2 in the case of an arrangement according to FIG. 7, while the upper surface 16 of the intermediate element is flat.

In the case of the variants, according to FIGS. 6 and 7 it must be noted that the radial elasticity of the slot wedge 1 is less than in the case of the variants without the intermediate layer 13 or 13' because in this case the transverse elasticity of the tongue is added to that of the slot wedge.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for sealing a slot, which has a conductor bar or coil positioned therein, in a laminated stator core of an electrical machine, which comprises:

at least one upper prismatic body having an underneath surface portion which is inclined in a longitudinal direction of the upper body, and a lower prismatic body, an upper surface of which faces the upper body and is inclined in an opposite direction to the inclination of the lower surface of the upper body, wherein wedging is produced by relative displacement of the upper and lower bodies with respect to one another, and wherein a force is introduced from the conductor bar or coil to the upper body, essentially at a central section thereof, over the entire length thereof and remaining sections of the lower surface of the upper body are spaced radially from the upper surface of the lower body.

2. An apparatus for sealing a slot, which has a conductor bar or coil positioned therein, in a laminated stator core of an electrical machine, which comprises:

at least one upper prismatic body having an underneath surface portion which is inclined in a longitudinal direction of the upper body, and a lower prismatic body, an upper surface of which faces the upper body and is inclined in an opposite direction to the inclination of the lower surface of the upper body, wherein wedging is produced by relative displacement of the upper and lower bodies with respect to one another, and wherein a force is introduced from the conductor bar or coil to the upper body, essentially at a central section thereof, over the entire length thereof, wherein said lower surface of the upper prismatic body is curved in a concave manner and wherein the upper surface of the lower body is curved in a convex manner, the radius of curvature of the lower surface being greater than the radius of curvature of the upper surface.

3. The apparatus as claimed in claim 2, wherein the radius of curvature of the lower surface is at least 5% greater than the radius of curvature of the upper surface.

4. An apparatus for sealing a slot as claimed in claim 1, wherein in a central section on the upper surface of the lower body facing the upper body, the lower body has a vertical strip-like projection extending in a longitudinal direction of the slot, and wherein the projection is integral with the lower body.

5. An apparatus for sealing a slot as claimed in claim 1, which has a conductor bar or coil positioned therein, in a laminated stator core of an electrical machine, which comprise:

at least one upper prismatic body having an underneath surface portion which is inclined in a longitudinal direction of the upper body, and a lower prismatic body, an upper surface of which faces the upper body and is inclined in an opposite direction to the inclination of the lower surface of the upper body, wherein wedging is produced by relative displacement of the upper and lower bodies with respect to one another, and wherein a force is introduced from the conductor bar or coil to the upper body, essentially at a central section thereof, over the entire length thereof;

wherein in the central section of the lower surface of the upper body facing the lower body, the upper body has a strip-like projection extending in a longitudinal direction of the slot, which is integral with the upper body.

6. The apparatus as claimed in claim 4, wherein the strip-like projection extends a maximum of one-third of the width of the slot.

7. The apparatus as claimed in claim 5, wherein the strip-like projection is a maximum of one-third of the slot width.

8. The apparatus as claimed in claim 1, wherein an intermediate element is provided between the conductor bar and the coil, the upper surface of said intermediate element, facing the lower body is curved in a convex manner, and wherein the lower surface of the lower body, facing the intermediate element, is curved in a concave manner, the radius of curvature of the lower surface of the lower body being greater than the radius of curvature of the upper surface of the intermediate element.

9. An apparatus for sealing a slot, which has a conductor bar or coil positioned therein, in a laminated stator core of an electrical machine, which comprises:

at least one upper prismatic body having an underneath surface portion which is inclined in a longitudinal direction of the upper body, a lower prismatic body, an upper surface of which faces the upper body and is inclined in an opposite direction to the inclination of the lower surface of the upper body, wherein wedging is produced by relative displacement of the upper and lower bodies with respect to one another, and wherein a force is introduced from the conductor bar or coil to the upper body, essentially at a central section thereof, over the entire length thereof and remaining sections of the lower surface of the upper body are spaced from the upper surface of the lower body, and an intermediate element is provided between the conductor bar or coil and the lower body, wherein the upper surface of said intermediate element faces the lower body and is curved in a convex manner and the lower surface of the lower body faces the intermediate element and is curved in a concave manner, the radius curvature of the lower surface of the lower body being greater than the radius of curvature of upper surface of the intermediate element, and wherein the radius of curvature of the lower surface of the upper body is at least 5% greater than the radius of curvature of the upper surface of the intermediate element.

* * * * *